United States Patent [19]

Moreland

[11] Patent Number: 4,781,794

[45] Date of Patent: Nov. 1, 1988

[54] DETACKIFICATION OF ADHESIVE MATERIALS CONTAINED IN SECONDARY FIBER

[75] Inventor: Robert D. Moreland, Jacksonville, Fla.

[73] Assignee: Betz Laboratories, Inc., Trevose, Pa.

[21] Appl. No.: 75,370

[22] Filed: Jul. 20, 1987

Related U.S. Application Data

[62] Division of Ser. No. 856,733, Apr. 28, 1986, Pat. No. 4,698,133.

[51] Int. Cl.⁴ ................................................ D21F 1/32
[52] U.S. Cl. .......................................... 162/199; 162/5
[58] Field of Search .................... 162/199, 177, 5, 186

[56] References Cited

U.S. PATENT DOCUMENTS

| | | | |
|---|---|---|---|
| 2,112,540 | 3/1938 | McAndrews et al. | 162/186 |
| 3,806,405 | 4/1974 | Heidweiller | 162/186 |
| 4,008,121 | 2/1977 | Coleman | 162/186 |
| 4,547,265 | 10/1985 | Forgione et al. | 162/13 S |
| 4,615,767 | 10/1986 | Miers et al. | 162/5 S |

*Primary Examiner*—Kenneth M. Schor
*Assistant Examiner*—K. M. Hastings
*Attorney, Agent, or Firm*—Alexander D. Ricci; Roslyn T. Tobe

[57] ABSTRACT

The present invention involves the use of a methyl cellulose derivative to control the depositing tendency of adhesive materials contained in waste paper and paper products which are being utilized to produce finished paper products.

9 Claims, No Drawings

DETACKIFICATION OF ADHESIVE MATERIALS CONTAINED IN SECONDARY FIBER

This is a division of application Ser. No. 856,733, filed on Apr. 28, 1986, now U.S. Pat. No. 4,698,133.

The present invention is directed to a particular problem associated with the secondary fiber industry. The problem addressed by the present invention is found in all stages of this particular industry, including the repulping stage, the paper or paper product formation stage, paper or paper product finishing stage, and the handling, storage and usage stages. The secondary fiber industry utilizes waste paper or paper products as a source of paper fiber (commonly referred to as "secondary fiber") to produce finished paper products. Waste paper and paper products which are the source of the secondary fiber include any waste paper product such as newspapers, books, magazines, waste bags and boxes, waste letters, files, waste cuttings or trimmings from pressure sensitive adhesive backed labels, decals, stickers, (i.e., bumper), etc. In producing the secondary fibers from these sources, a particular problem is encountered due to the adhesives, ink and coating binders (primarily those composed of synthetic polymers) that are found on some of the waste paper being utilized. More specifically labels, decals, stickers, stamps, envelopes, book bindings, etc., each have adhesives associated therewith and accordingly when waste products are recycled, the adhesives give rise to a contamination problem which is commonly referred to as "stickies". Stickies are the remainder of the adhesives, ink and coating binders (hot melt or pressure sensitive) and cause users of waste paper a range of problems relating to machine runnability through to finished product quality.

Since stickies generally have the same density as water and fiber, they are difficult to remove. The stickies may be pliable and therefore cannot be completely screened from the water and/or fiber mixture. Equipment currently being utilized is effective to a certain degree but not 100%.

The unremoved stickies cause problems to the manufacturing equipment, since they deposit on the forming fabrics, the felt, the rolls, machine wires, belts, presses, dryer surfaces, etc. The stickies also mark or hole the sheet.

If the stickies do not adhere to the machine parts they can be incorporated in the finished sheet, causing problems when the finished sheet is converted into whatever the finished product may be. Here again the stickies will deposit and adhere to rolls or create sheet breaks during the unwind or rewind operations since the stickies in the sheets (when rolled upon themselves) have a tendency to adhere the surfaces together.

Obviously production economies are affected quite severely when stickies-related problems are encountered. Stickies commonly necessitate complete shutdown of the manufacturing equipment in order to remove such by solvent washing techniques. The cleaning process is expensive due to downtime as well as solvent costs.

GENERAL DESCRIPTION OF THE INVENTION

The present inventor discovered that the adhesion of pressure sensitive materials can be drastically reduced by treatment of such with dilute aqueous solutions of a particular cellulose derivative. Since it is the property of contact adhesion that causes stickies to be so troublesome, there was a need for a treatment for controlling the depositing tendency and the resulting interference with runnability. Although the most desirable stage for addition of the cellulosic material is at a location in which it will be in intimate contact with the adhesive contaminated stock for an appropriate amount of time to perform its function (e.g. for at least 30 minutes) prior to the stock passing point at which the stickies would normally deposit, the cellulosic material may for example be added to the paper machine showering systems that wet and lubricate the felts and forming fabrics. Conventionally, water sprays or showers are used on the return run of the forming screen or wire.

The invention is particularly effective in combatting stickies problems when the recycled waste paper or paper product contains pressure sensitive adhesives comprised of styrene butadiene rubber (SBR), vinylacrylic based adhesives, polyvinyl alcohol and derivatives thereof, natural rubber, polyisoprene, etc. It is also expected that the invention would be applicable in combatting stickies problems which are due to hot melt adhesives which become pressure sensitive when temperatures during processing are slightly below their melting points. Hot melt adhesives include polymeric materials such as polystyrene, polypropylene, polyethylene, ethylenevinyl acetate and the like.

The invention calls for the use of lower alkyl derivatives of cellulose. The materials that have been tested and found effective for this application are all water soluble methyl ether derivatives of cellulose. Higher alkyl (e.g. $C_1$ to $C_{10}$) ether derivatives of cellulose and alkyl linkages other than ethers would be expected to function in this application so long as they are water soluble. Methyl ether derivatives of cellulose are commercially available in three types: methyl cellulose, hydroxypropyl methyl cellulose and hydroxybutyl methyl cellulose.

Methyl ether derivatives of cellulose are made by reacting cellulose with the appropriate reagent in the presence of caustic soda. Methyl cellulose is made using methyl chloride, hydroxypropyl methyl cellulose is made using propylene oxide and methyl chloride and hydroxybutyl methyl cellulose is made using butylene oxide and methyl chloride. Among these three types, there are variations in molecular weight ranging from 10,000 to 246,000 which corresponds to a degree of polymerization of 53 to 1,280 anhydroglucoside units. The number of substitution groups on the anhydrglucoside units of the cellulose polymer can effect the solubility properties, but all levels of substitution that are water soluble are believed to be part of this invention. The cellulose derivatives may contain only methyl ether substitution, or hydroxyl propyl methyl ether substitution or hydroxyl butyl ether substitution or other groups may be added that do not affect the efficacy of the cellulose derivative for this purpose. As indicated on pages 250 through 253 of the *Encyclopedia of Polymer Science and Engineering*, Vol. 3, 1985, John Wiley & Sons, New York, NY, the methyl ether derivatives encompassed by the present invention are generally nonionic in nature and the methyl group of the methyl ether moiety is unsubstituted.

For the best results, the methyl ether cellulose derivatives are added to the repulping or papermaking system at a location that will allow intimate contact between the treatment and the contaminated paper stock for a period of time sufficient to permit the derivative to perform its function. A period of at least 30 minutes has been found to be effective. The concentration of the methyl ether cellulose derivatives should be sufficient to allow for subsequent dilution so that a concentration of 1 ppm or more and preferably 1-20 ppm is maintained in the repulper or on the paper machine at the point where stickies deposit control is desired. Additionally, the cellulose derivative materials may be added to the spray waters utilized during the paper sheet-making process. In the latter regard, during formation of the fibrous sheet on the wires and/or fabrics, and the rolling or pressing of the fibrous sheet, the sheet is being subjected to various sprays or showers. Accordingly to insure against any problems due to stickies on felts or press rolls, it is desirable to add the cellulose materials of the invention to water showers or sprays that are used to clean and lubricate these parts.

EXPERIMENTAL

In order to establish the efficacy of the cellulose derivatives of the invention as detackification agents, a laboratory test was devised utilizing adhesive-backed tapes as stickies coupons.

The stickies coupon can be fabricated from any type of adhesive tape that will not disintegrate when placed in water. The most meaningful results are obtained when the stickies coupon is fabricated from a tape is made with an adhesive that is causing quality or runnability problems in paper manufacture. For the study, tapes made from a styrene butadiene rubber and vinylic esters were used. Both of these materials are known to cause problems (stickies) in secondary fiber utilization. A second coupon is fabricated from polyester film such as the product marketed as MYLAR ® by the DuPont Chemical Company. This material was chosen because paper machine forming fabrics are frequently made of polyester which is susceptible to considerable problems caused by stickies.

140 ml of solutions in 150 ml beakers containing various cellulose derivatives are placed in a water bath heated to 50° C. The stickies coupons and the polyester film coupons are placed in the test solution so the adhesive side of the coupon faces away from the polyester film coupon. After 1 hour of immersion, the adhesive side of the stickies coupon is placed in contact with the polyester coupon and pressed to 25 psi between rubber mats in a press with heated platens.

The average peel strength of the bond formed between the stickies tape coupon and the polyester coupon was measured with an Instron tensile tester. The peel strength of the bond formed between the stickies tape coupon and the polyester coupon was intepreted as a measure of the tendency for an adhesive stickies contaminant to attach to components of the repulper and/or the paper machine and cause runnability or product quality problems.

The cellulose ethers utilized in accordance with the studies described as follows are described in the Table A below.

TABLE A

| Cellulose Ether | Chemical Type | Viscosity of 2% Solution at 20° C. MpaS |
|---|---|---|
| I | Hydroxypropyl methyl cellulose | 50 |
| II | Methyl cellulose | 15 |
| III | Hydroxypropyl methyl cellulose | 5 |
| IV | Hydroxypropyl methyl cellulose | 50 |

TABLE A-continued

| Cellulose Ether | Chemical Type | Viscosity of 2% Solution at 20° C. MpaS |
|---|---|---|
| V | Hydroxypropyl methyl cellulose | 50 |
| VI | Hydroxypropyl methyl cellulose | 25 |
| VII | Methyl cellulose | 80 |
| VIII | Methyl cellulose | 25 |
| IX | Hydroxypropyl methyl cellulose | 450 |
| X | Methyl cellulose | 4,000 |
| XI | Hydroxypropyl methyl cellulose | 4,000 |
| XII | Hydroxybutyl methyl cellulose | 100 |

The cellulose derivatives were obtained from different sources.

Study 1

The tables that follow illustrate the results obtained using two methyl ether cellulose derivatives in accordance with the test procedure outlined above.

TABLE 1A

Effect of Methyl Ether Cellulose Derivatives on the Bond Strength of Styrene Butadiene Adhesive to Polyester Film

| Treatment Concentration | Cellulose Ether I | Cellulose Ether II |
|---|---|---|
| 0 ppm | 5.55 ± 0.15 lbs | 5.55 ± 0.15 lbs |
| 0.5 ppm | 3.28 ± 0.13 lbs | 2.93 ± 0.15 lbs |
| 1.0 ppm | 1.03 ± 0.03 lbs | 0.78 ± 0.07 lbs |
| 2.0 ppm | 0.28 ± 0.03 lbs | 0.43 ± 0.23 lbs |

Values in the table are the average of two measurements and the deviation from the average of each measurement.

Similarly, Table 1B illustrates the effect of the same cellulose ethers on the adhesion of a tape that was analyzed and found to contain vinylic ester adhesives.

TABLE 1B

Effect of Cellulose Ethers on the Bonding Strength of an Adhesive Containing Vinylic Esters to the Polyester Film.

| Treatment Concentration | Cellulose Ether I | Cellulose Ether II |
|---|---|---|
| 0 ppm | 2.70 ± 0 lbs | 2.70 ± 0 lbs |
| 0.5 ppm | 1.50 ± 0.1 lbs | 1.43 ± 0.03 lbs |
| 1.0 ppm | 1.05 ± 0.05 lbs | 0.65 ± 0.03 lbs |
| 2.0 ppm | 0.30 ± 0 lbs | 0.25 ± 0 lbs |

Additional studies were conducted to compare the results obtained with different cellulose ethers.

Study 2

The adhesive utilized in this study was styrene butadiene rubber (SBR). These coupons were also treated 60 minutes in a 50° C. H₂O both and pressed for 60 seconds in a press at 25 psi and 50° C. Peel strengths were measured on an Instron tester.

TABLE 2

| Treatment Concentration | Cellulose Ether III | Cellulose Ether I | Cellulose Ether IV |
|---|---|---|---|
| 0 | 4.75 lbs | 4.75 lbs | 4.75 lbs |
| 0.5 | 2.27 lbs | 2.85 lbs | 2.92 lbs |
| 1.0 | 1.47 lbs | 1.30 lbs | 0.37 lbs |
| 2.0 | 0.65 lbs | 0.32 lbs | 0.35 lbs |
| 4.0 | 0.27 lbs | 0.1 lbs | 0.15 lbs |

Study 3

Since the treatment would have to function in the presence of paper fiber and alum $(Al_2(SO_4)_3 \cdot (H_2O)_n = 16$ to 18), a variation on the test was devised to establish that the presence of paper fiber and alum would not adversely affect the performance of the treatment. Treatment solutions were prepared in deionized water, deionized water containing 0.5% bleached paper fiber, and 0.5% bleached paper fiber plus 15 pounds per ton alum based on the fiber present. These solutions were allowed to stand for 1 hour after which the solutions were filtered and collected and the adhesion test was run on the solution as before. The resuls are shown in Table 3.

TABLE 3

| Treatment Concentration ppm | Cellulose Ether III in Deionized Water | Cellulose Ether III in 0.5% Paper Fiber | Cellulose Ether III in 0.5% Paper Fiber Plus 37.5 ppm Alum |
| --- | --- | --- | --- |
| 0 | 4.7 lbs | 4.5 lbs | 2.90 lbs |
| 0.5 | 2.1 lbs | 4.4 lbs | 3.20 lbs |
| 1.0 | 1.4 lbs | 2.75 lbs | 0.97 lbs |
| 2.0 | 0.65 lbs | 1.4 lbs | 0.50 lbs |
| 4.0 | 0.4 lbs | 0.7 lbs | 0.20 lbs |

The effect was depressed slightly by the paper fiber but was enhanced when alum was added.

Study 4

Additional studies were conducted with cellulose ethers from a different manufacturer using SBR tape. The results of these studies are reported in Tables 4A and 4B.

TABLE 4A

| Treatment Concentration ppm | Cellulose Ether V | Cellulose Ether VI | Cellulose Ether VII | Cellulose Ether VIII |
| --- | --- | --- | --- | --- |
| 0.0 | 4.87 lbs | 4.87 lbs | 4.87 lbs | 4.87 lbs |
| 0.5 | 3.20 lbs | 2.20 lbs | 2.25 lbs | 5.65 lbs |
| 1.0 | 1.20 lbs | 1.20 lbs | 1.50 lbs | 2.00 lbs |
| 2.0 | 0.42 lbs | 0.65 lbs | 0.30 lbs | 1.17 lbs |
| 4.0 | 0.3 lbs | 0.65 lbs | 0.15 lbs | 0.27 lbs |

TABLE 4B

| Treatment Concentration ppm | Cellulose Ether IX | Cellulose Ether X | Cellulose Ether XI |
| --- | --- | --- | --- |
| 0 | >5.00 lbs | 4.8 lbs | 4.8 lbs |
| 0.5 | 4.10 lbs | 3.25 lbs | 3.72 lbs |
| 1.0 | 2.30 lbs | 2.25 lbs | 1.90 lbs |
| 2.0 | 1.45 lbs | — | — |
| 4.0 | 0.30 lbs | — | — |

It is apparent from the results of the studies conducted that the cellulose ethers of the present invention were effective for the purpose described.

Study 5

An additional study was conducted using the procedure outline above utilizing a commercially available hydroxy butyl methyl cellulose (Cellulose Ether XII) and a SBR tape. The results are tabulated in the following Table 5.

TABLE 5

| Treatment Dosage (ppm) | Bond Strength in Pounds |
| --- | --- |
| Control | 5.15 |
| 0.5 ppm | 2.65 |
| 1.0 | 1.50 |
| 2.0 | .18 |
| 3.0 | .10 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method of detackifying hot melt and/or pressure sensitive adhesive material contained in a pulp produced from waste paper and reducing the deposition of the adhesive material on the paper web forming screen or wire by subjecting the forming screen or wire to water sprays and showers on its return run after the paper web has been separated from the forming screen or wire at the couch roll which comprises adding to the water sprays or showers a sufficient amount of a nonionic water soluble polymer comprised of unsubstituted methyl ether cellulose derivatives which is effective to carry out said detackifying.

2. A method according to claim 1 wherein the cellulose derivative is selected from the group consisting of methyl cellulose, hydroxypropyl methyl cellulose, hydroxybutyl methyl cellulose, and mixtures thereof.

3. A method according to claim 2 wherein the cellulose derivative is added to said water sprays or showers in an amount of from about 1-20 ppm based on pounds of material fed per million pounds of water.

4. A method according to claim 3 wherein the adhesive material is selected from the group consisting of sytrene butadiene rubber, vinyl-acrylic, polyvinyl alcohol, natural rubber, isoprene, polystyrene, polypropylene, and ethylene-vinyl acetate adhesives.

5. A method of detackifying hot melt and/or pressure sensitive adhesive materials contained in a pulp produced from waste paper and reducing the deposition of the adhesive material on the surfaces of equipment utilized to produce finished paper products from said pulp produced from waste paper products which comprises adding to the water sprays or showers used to clean and lubricate said equipment surfaces a sufficient amount of a nonionic water-soluble polymer comprised of unsubstituted methyl ether cellulose derivatives which is effective to carry out said detackifying.

6. A method according to claim 5 wherein the cellulose derivative is selected from the group consisting of methyl cellulose, hydroxypropyl methyl cellulose, hydroxybutyl methyl cellulose, and mixtures thereof.

7. A method according to claim 5 wherein the cellulose derivative is added to said water sprays or showers in an amount of from about 1-20 ppm based on water mass flow.

8. A method according to claim 7 wherein the adhesive material is selected from the group consisting of styrene butadiene rubber, vinyl-acrylic, polyvinyl alcohol, natural rubber, isoprene, polystyrene, polypropylene, and ethylene-vinyl acetate adhesives.

9. A method according to claim 5 wherein the cellulose derivative is added in an amount of from 1 to 20 ppm, based on pounds of material fed per million pounds of water, the derivative is selected from the group consisting of methyl cellulose, hydroxypropyl methyl cellulose, hydroxybutyl methyl cellulose, and mixtures thereof, and the adhesive material is selected from the group consisting of styrene-butadiene rubber, vinyl-acrylic, polyvinyl alcohol, natural rubber, isoprene, polystyrene, polypropylene and ethylene vinyl acetate adhesives.

* * * * *